US007266389B2

(12) United States Patent
Karaoguz et al.

(10) Patent No.: US 7,266,389 B2
(45) Date of Patent: Sep. 4, 2007

(54) DEVICE FOR SELECTIVE POWER MANAGEMENT FOR A HAND HELD HOST

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 315 days.

(21) Appl. No.: 10/285,005

(22) Filed: Oct. 31, 2002

(65) Prior Publication Data

US 2004/0204175 A1    Oct. 14, 2004

Related U.S. Application Data

(60) Provisional application No. 60/403,224, filed on Aug. 12, 2002.

(51) Int. Cl.
*H04M 1/38* (2006.01)
(52) U.S. Cl. ............................ 455/556.1; 455/556.2; 455/574
(58) Field of Classification Search ............. 455/556.1, 455/556.2, 574, 343.1, 343.5, 127.5, 41; 375/295; 708/100; 713/320
See application file for complete search history.

(56) References Cited

U.S. PATENT DOCUMENTS

| | | | |
|---|---|---|---|
| 4,794,649 A | 12/1988 | Fujiwara | |
| 5,710,975 A | 1/1998 | Bernhardt et al. | |
| 5,748,103 A | 5/1998 | Flach et al. | |
| 5,799,256 A | 8/1998 | Pombo et al. | |
| 5,983,100 A * | 11/1999 | Johansson et al. | 455/426.1 |
| 6,144,976 A * | 11/2000 | Silva et al. | 708/100 |
| 6,356,538 B1 | 3/2002 | Li | |
| 6,463,050 B1 | 10/2002 | Nagashima | |
| 6,466,781 B1 | 10/2002 | Bromba et al. | |
| 6,574,489 B1 | 6/2003 | Uriya | |
| 6,725,060 B1 | 4/2004 | Chhatriwala et al. | |
| 6,856,597 B1 | 2/2005 | Scott | |
| 2003/0040275 A1 * | 2/2003 | Bridgelall | 455/41 |
| 2003/0135771 A1 * | 7/2003 | Cupps et al. | 713/320 |
| 2003/0158609 A1 | 8/2003 | Chiu | |
| 2003/0161411 A1 * | 8/2003 | McCorkle et al. | 375/295 |
| 2004/0166895 A1 * | 8/2004 | Koenck et al. | 455/556.1 |

\* cited by examiner

*Primary Examiner*—Joseph Feild
*Assistant Examiner*—Phuoc Doan
(74) *Attorney, Agent, or Firm*—Garlick Harrison & Markison; James A. Harrison

(57) ABSTRACT

A hand held radio host includes circuitry for selectively providing power to radiating transceiver elements and non-radiating application elements according to a plurality of power modes of operation to achieve desired effects and in a way that saves power and extends battery life. In one embodiment of the invention, the hand held host operates in one of three modes. In a full power mode, any selected application element as well as all transceiver elements are powered on at the same time. Thus, for example, a cell phone module, a wireless personal access network module, a wireless local area network module and one of a pager/short message service message module may all be powered on at the same time to receive corresponding messages, calls, data sessions, etc. At the same time that all of the transceiver elements are powered on, any selected application element receives power. Thus, application elements such as address books, calendar functions, games, word processors, etc may receive power when selected.

43 Claims, 12 Drawing Sheets

FIG. 3  hand held host 30

FIG. 4 hand held host 32

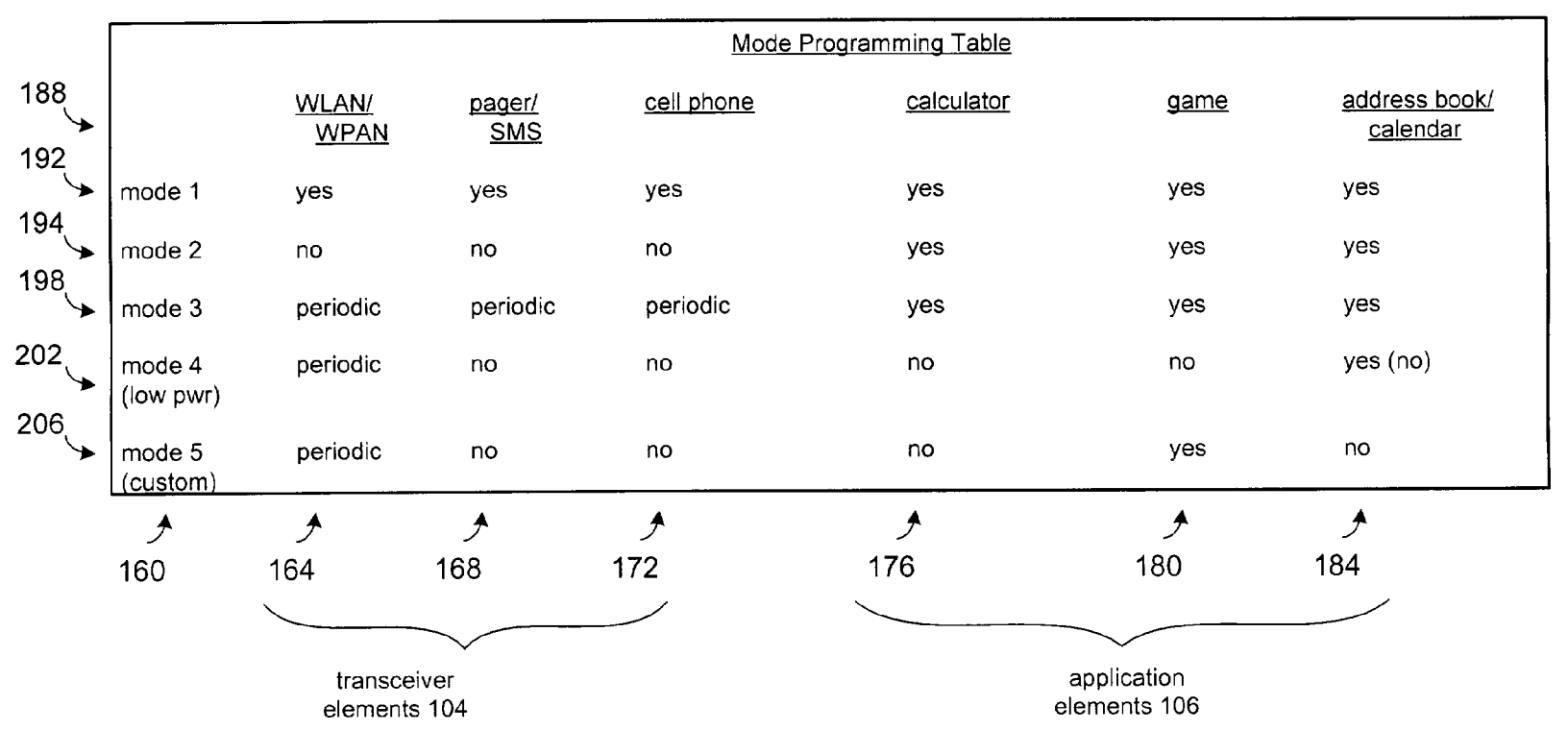

Mode Programming Table

| | WLAN/WPAN | pager/SMS | cell phone | calculator | game | address book/calendar |
|---|---|---|---|---|---|---|
| mode 1 | yes | yes | yes | yes | yes | yes |
| mode 2 | no | no | no | yes | yes | yes |
| mode 3 | periodic | periodic | periodic | yes | yes | yes |
| mode 4 (low pwr) | periodic | no | no | no | no | yes (no) |
| mode 5 (custom) | periodic | no | no | no | yes | no |

FIG. 5

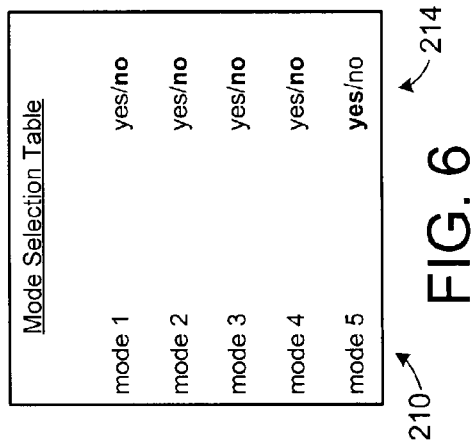
FIG. 6
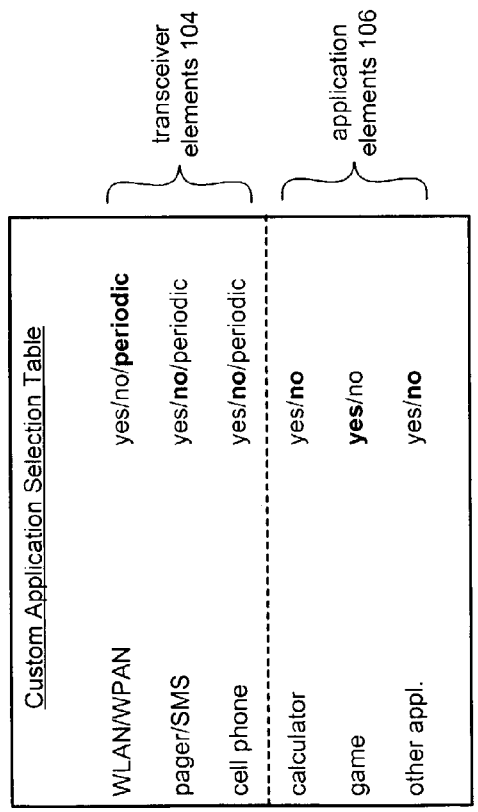
FIG. 8
FIG. 7

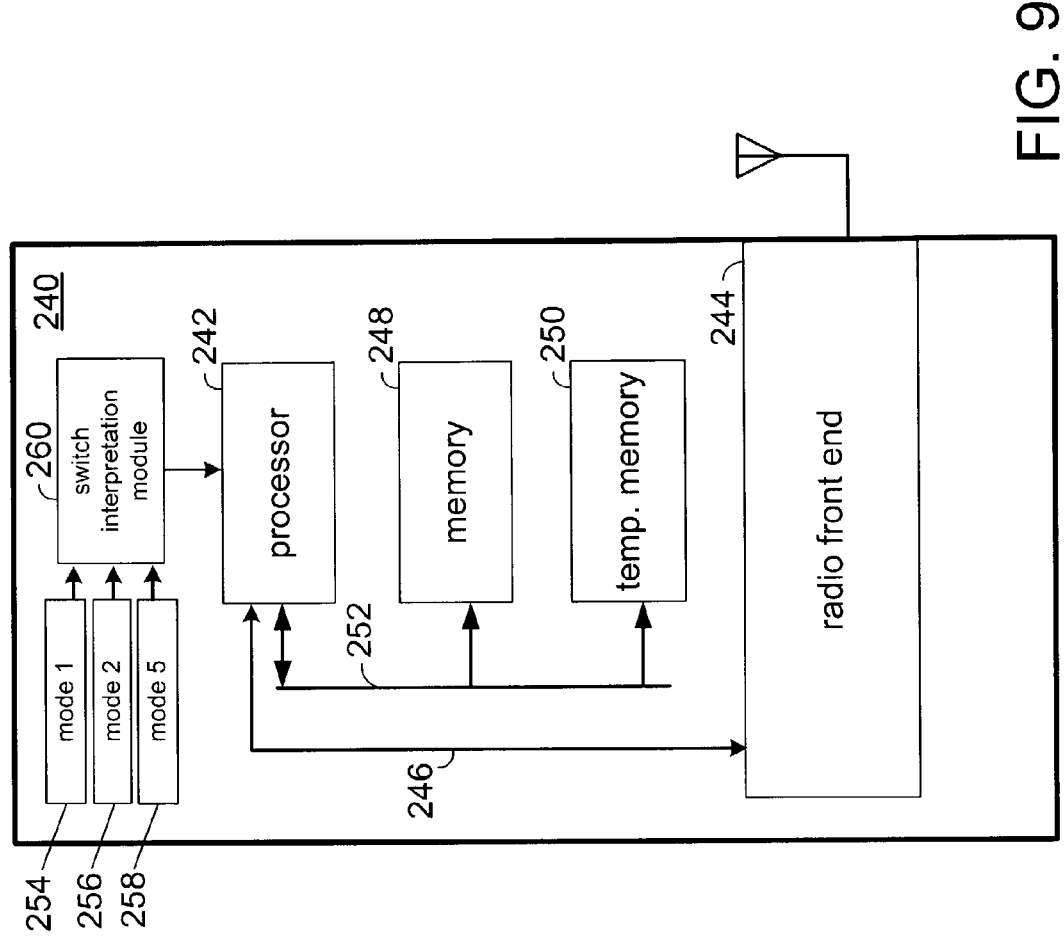

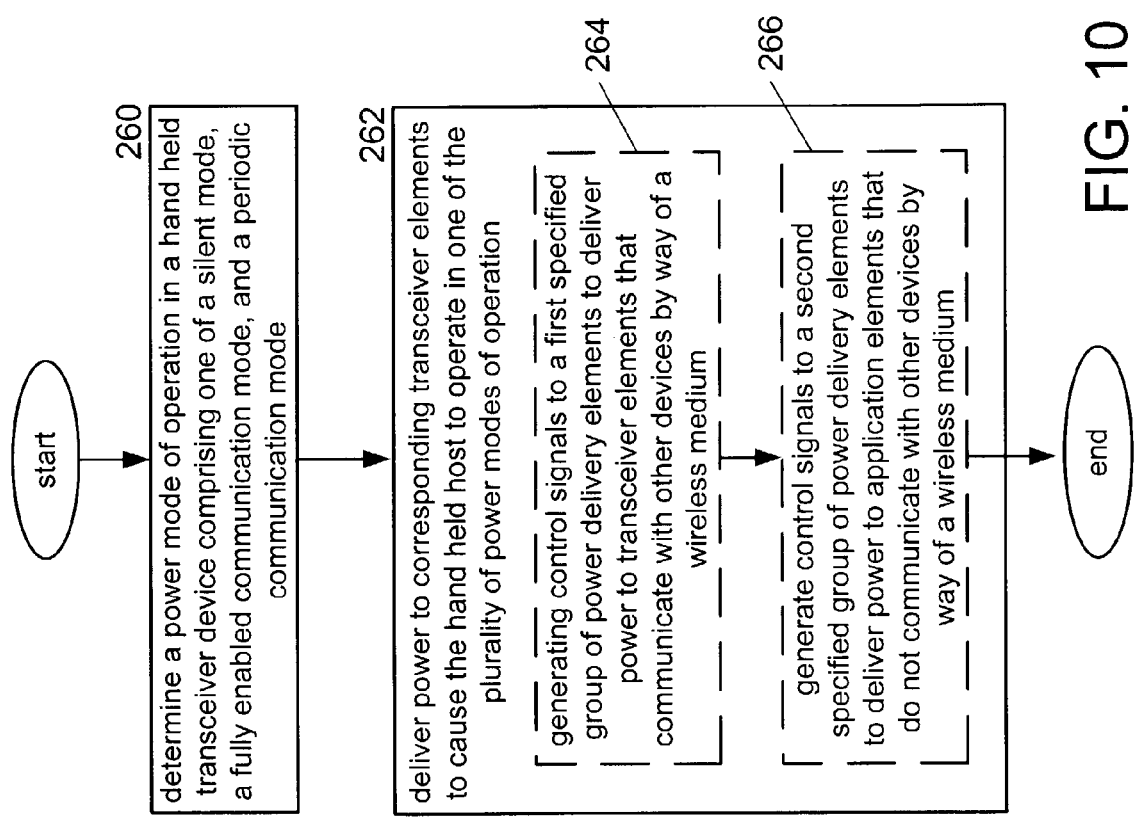

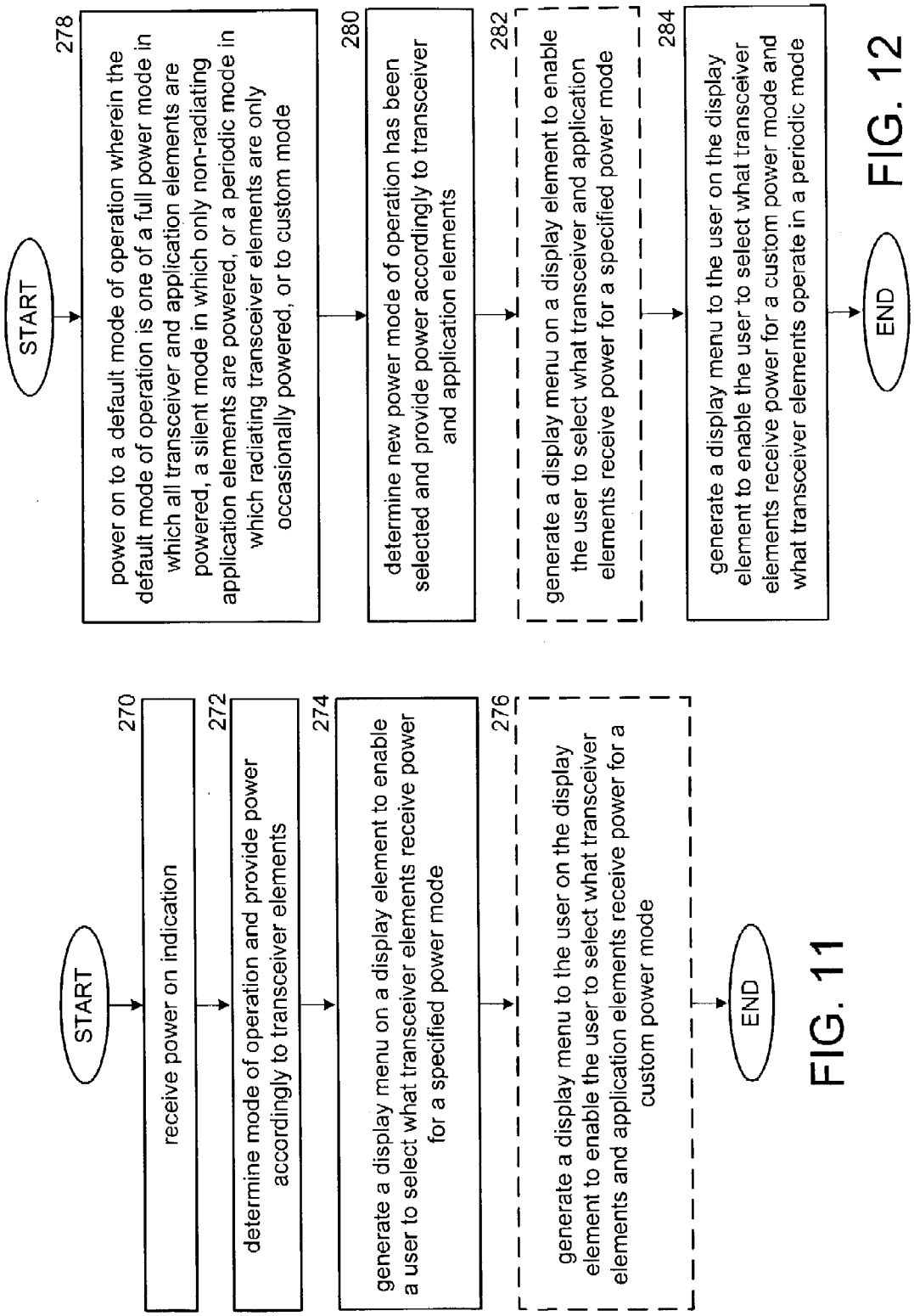

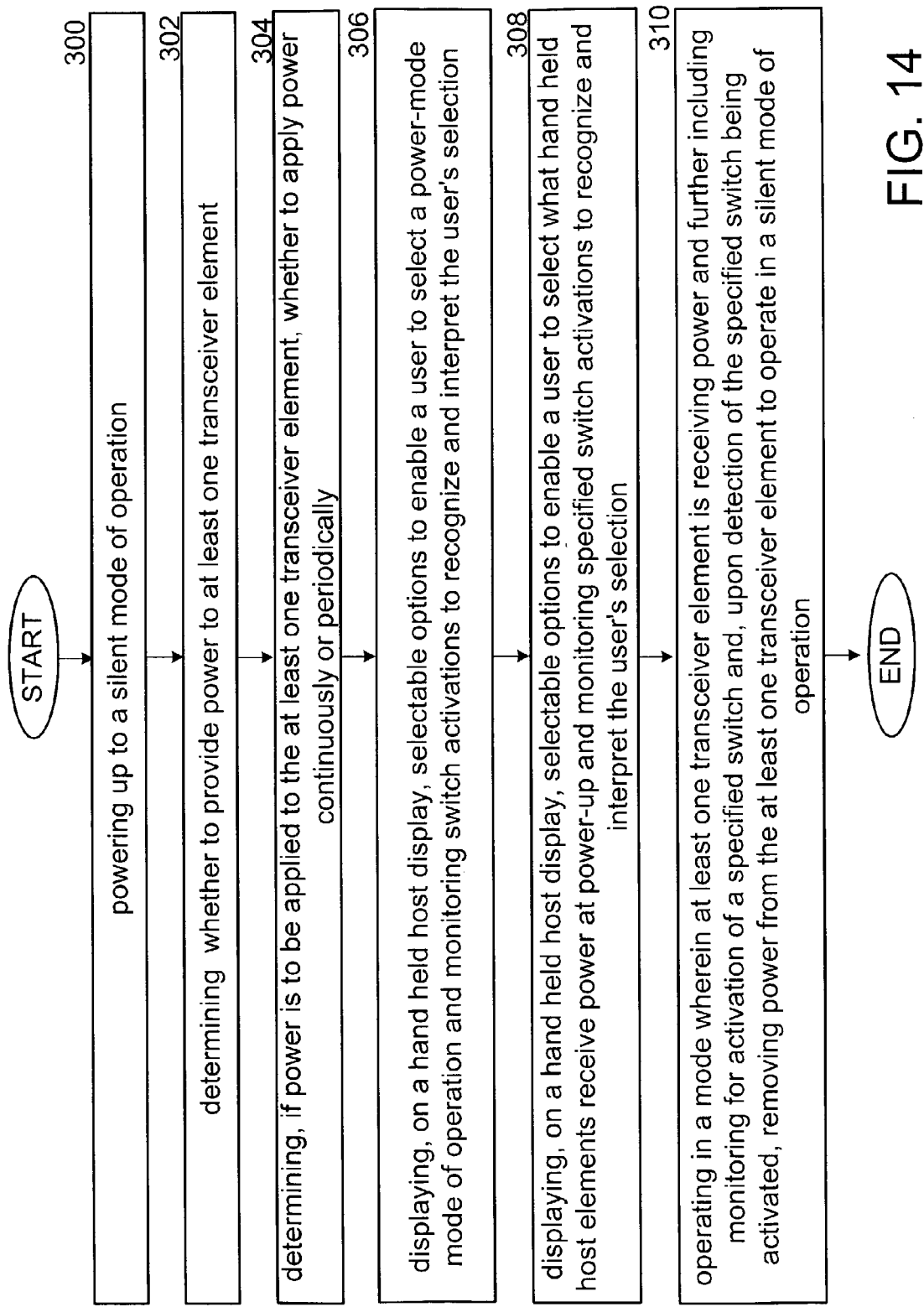

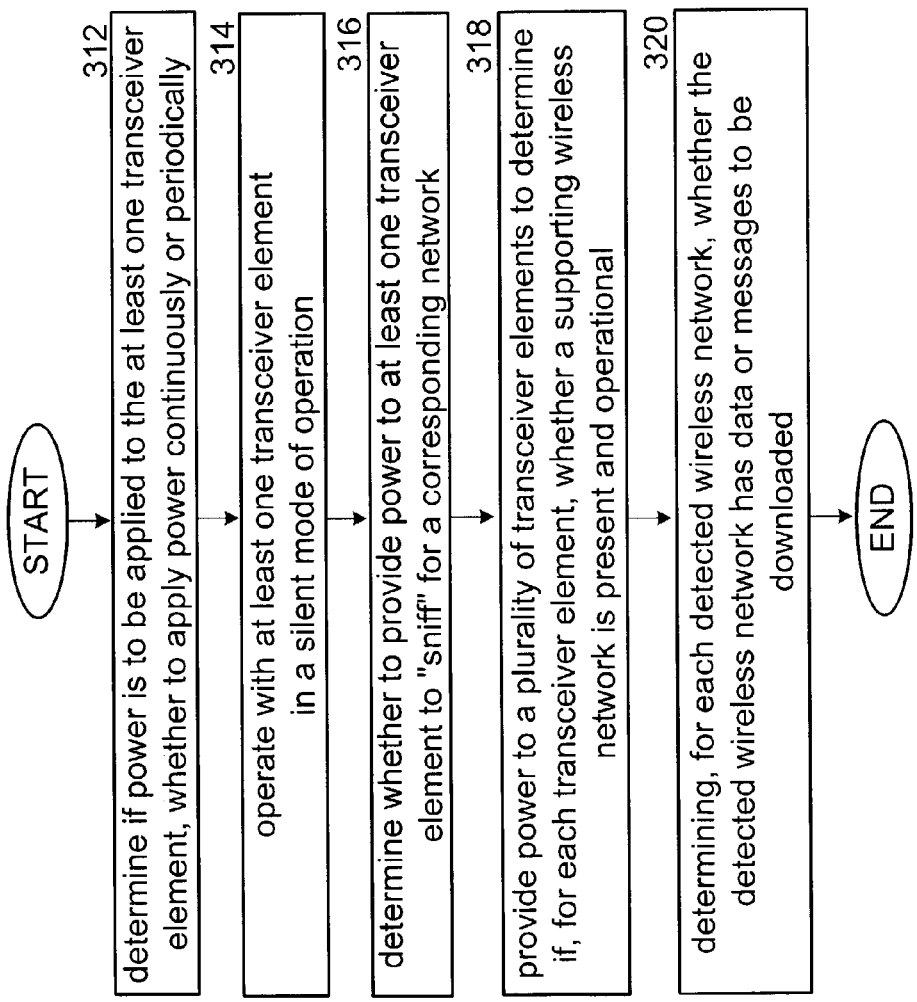

DEVICE FOR SELECTIVE POWER MANAGEMENT FOR A HAND HELD HOST

CROSS-REFERENCE TO RELATED APPLICATION(S)

This application claims priority to and incorporates by reference U.S. Provisional Application entitled, "Power Management of Radio Receiver Elements", having a Ser. No. 60/403,224 and a filing date of Aug. 12, 2002, and U.S. Utility Application entitled, "Power Management of Radio Transceiver Elements", having a Ser. No. 10/277,787 and a filing date of Oct. 22, 2002.

BACKGROUND OF THE INVENTION

1. Technical Field of the Invention

This invention relates generally to wireless communication systems and more particularly to radio frequency integrated circuits used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

For each wireless communication device to participate in wireless communications, it either includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage converts raw data into baseband signals in accordance with a particular wireless communication standard. The one or more IF stages mix the baseband signals with one or more local oscillations to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies them. The one or more IF stages mix the amplified RF signals with one or more local oscillations to convert the amplified RF signal into baseband signals or IF signals. The filtering stage filters the baseband signals or the IF signals to attenuate unwanted out-of-band signals to produce filtered signals. The data recovery stage recovers raw data from the filtered signals in accordance with the particular wireless communication standard.

The need for wireless networking has been addressed by various standards bodies that promulgate inter-working standards. One such standards body promulgated the IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data. However, IEEE 802.11 networks lack high data rate and Quality of Service (QOS) features to support multimedia communications.

Wireless personal area networks (WPANs) enable short-range "ad-hoc" connectivity among portable consumer electronics and communication devices but do not require the infrastructure needed for an 802.11 network. The WPAN™ Study Group (SG) was formed on Mar. 12, 1998 by the IEEE 802.11 Working Group to investigate the need for a supplemental wireless network standard specifically targeted to provide very low power consumption, low complexity, wireless connectivity among devices within or entering a Personal Operating Space (POS). This includes devices that are carried, worn, or located near the body. These activities have led to the development of 802.15, which is a WPAN standard.

Another known WPAN is Bluetooth. For both Bluetooth and 802.15 WPANs, the coverage area for a WPAN is generally within a 10-meter radius. In other words, a personal operating space (POS) is the space about a person that typically extends up to 10 meters in all directions and envelops the person whether stationary or in motion. It is within the POS that the portable device communicates with an access point. The Bluetooth radio system has emerged as the first technology addressing WPAN applications with its salient features of low power consumption, small package size, and low cost. Raw data rates for Bluetooth devices are limited to 1 Mbps, although the actual throughput is about half of the raw data rate. A Bluetooth communication link supports up to three voice channels with very limited additional bandwidth for bursty data traffic. However, Bluetooth communication links cannot support the data transfer requirements of portable consumer electronics devices that transmit and receive multimedia data, e.g., high quality video applications, audio applications, and multi-megabyte file transfers for music and image files.

Each of the various stages of the radio receiver, whether its part of Bluetooth or an 802.15 WPAN, an 802.11 wireless local area network, or a cellular radio network, consume differing amounts of power but often operate on battery power. Because it is desirable to extend battery life to a maximum amount, many different communication devices provide for a sleep mode in which a radio is powered down until activated by the depression of a key or the like. Moreover, some of the standards provide for powering down a receiver for a specified period of time and then powering the receiver back up to enable it to engage in communications. The current designs and proposals, however, do not provide any suggestions for maximizing the amount of power savings and do not provide for power saving modes and periods that maximally extend battery life.

Therefore, a need exists for a power management mode of operation that improves the power management functionality of a hand held device and that maximizes battery life before recharging is required.

BRIEF SUMMARY OF THE INVENTION

A hand held radio host includes circuitry for selectively providing power to radiating transceiver elements and non-radiating application elements according to a plurality of power modes of operation to achieve desired effects and in a way that saves power and extends battery life. In one embodiment of the invention, the hand held host operates in one of three modes. In a full power mode, any selected application element as well as all transceiver elements are powered on at the same time. Thus, for example, a cell phone module, a wireless personal access network module, a wireless local area network module and one of a pager/short message service message module may all be powered on at the same time to receive corresponding messages, calls, data sessions, etc. At the same time that all of the transceiver elements are powered on, any selected application element receives power. Thus, application elements such as address books, calendar functions, games, word processors, etc may receive power when selected.

In a second mode of operation, namely, a silent mode of operation, only selected application elements can receive power. Radiating transceiver elements do not receive power in this mode of operation. Thus, upon selection of this mode, transceiver elements do not radiate but the application elements are readily accessible. This is helpful in many situations including, for example, in flight where it is prohibited to use devices that radiate while cockpit or cabin doors are closed.

In a third mode of operation, selected application modules receive power. Transceiver elements, however, only receive power on a periodic basis. In one embodiment of the invention, the transceiver elements receive power in a fixed interval, for example, once every five minutes. When a transceiver device receives power in the periodic mode, it receives power as long as is necessary to down load any pending messages or data files.

The invention further includes providing user selectable menus to enable a user to select what transceiver elements and application elements receive power in a custom mode of operation. In a different embodiment, each power mode of operation has selectable application and transceiver elements for receiving power whenever the various modes are selected. Finally, the user selectable menus enable the user to select a power-up mode of operation. Thus, for example, the user is able to select a particular application element for the default power-up mode of operation to enable the user to selectively activate remaining transceiver and application elements.

The various user selections are made through a graphical user interface in one embodiment of the invention. In another embodiment of the invention, however, the hand held host includes a plurality of power switches wherein each one corresponds to a mode of operation. The modes of operation, however, may be defined. More specifically, user selected transceiver and application elements are mapped to each of the plurality of power switches. Thus, regardless of whether the hand held host is powering on from an off state or is transitioning to the selected mode of operation, the user is able to specifically and easily control the mode of operation by predefining what elements corresponding to a particular switch (hardware or software) and then by depressing the switch whenever the corresponding mode of operation is desired.

BRIEF DESCRIPTION OF THE SEVERAL VIEWS OF THE DRAWINGS

FIG. 5 is a table illustrating one embodiment of the operation of the present invention;

FIG. 6 is a table illustrating mode selection according to one aspect of the present invention;

FIG. 7 is a table illustrating an aspect of one embodiment of the present invention and, more specifically, the selection of operating parameters for a custom mode of operation;

FIG. 8 illustrates a default power on selection table illustrating yet another aspect of the present invention;

FIG. 9 is a functional block diagram of an alternate embodiment of the invention of a hand held host;

FIG. 10 is a flowchart illustrating a method of one embodiment of the present invention;

FIG. 11 is a flowchart illustrating an aspect of the operation of one embodiment of the present invention;

FIG. 12 is a flowchart illustrating an aspect of one embodiment of the invention;

FIG. 14 is a flowchart illustrating a method for power control of a hand held host with transceiver and application elements according to one embodiment of the present invention; and FIG. 15 is a flow chart illustrating an additional embodiment of the present invention.

DETAILED DESCRIPTION OF THE INVENTION

Figure 1:
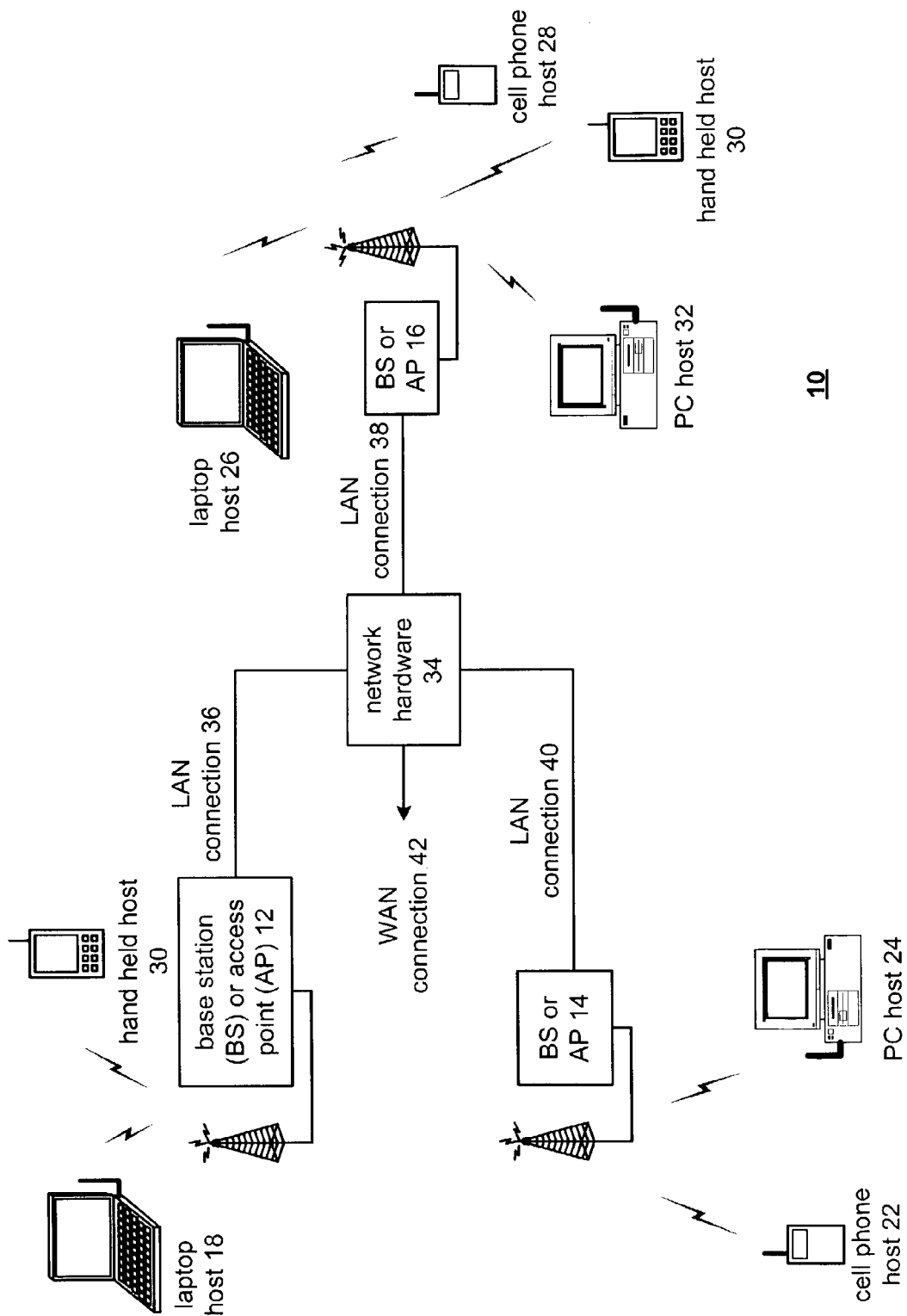
FIG. 1 is a schematic block diagram of a wireless communication system in accordance with the present invention.

FIG. 1 is a schematic block diagram illustrating a communication system 10 that includes a plurality of base stations or access points 12-16; a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a highly linear amplifier and/or programmable multi-stage amplifier, as disclosed herein, to enhance performance, reduce costs, reduce size, and/or enhance broadband applications.

Figure 2:
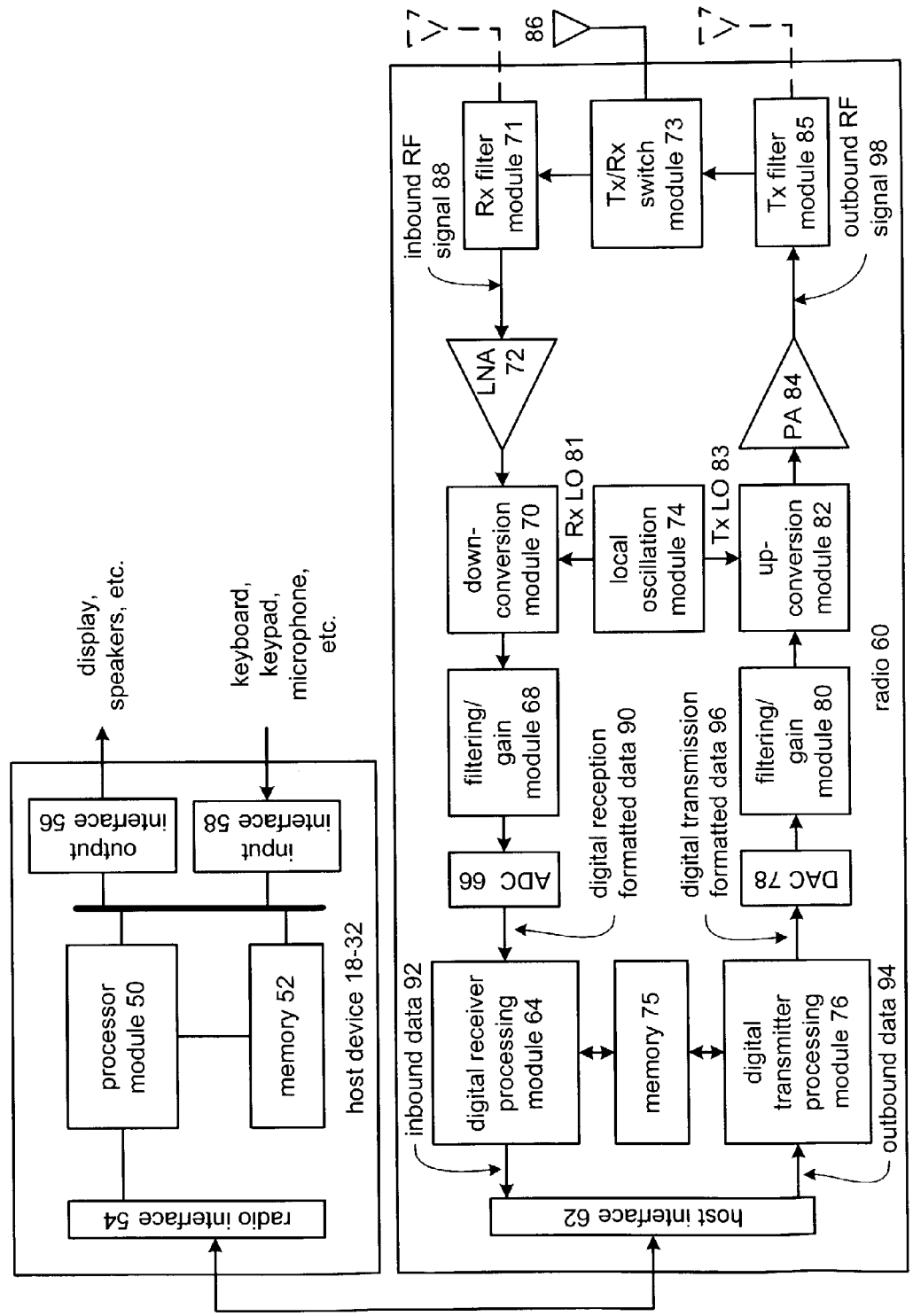
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processor module 50, a memory 52, a radio interface 54, an input interface 58 and an output interface 56. The processor module 50 and memory 52 execute the corresponding instructions that are typically done by the host device. For example, for a cellular telephone host device, the processor module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processor module 50 for further processing and/or routing to the output interface 56. The output interface 56 provides connectivity to an output display device, such as a display, monitor, speakers, etc., such that the received data may be displayed. The radio interface 54 also provides data from the processor module 50 to the radio 60. The processor module 50 may receive the outbound data from an input device such as a keyboard, keypad, microphone, etc., via the input interface 58 or generate the data itself. For data received via the input interface 58, the processor module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, an IF mixing down-conversion module 70, a receiver filter module 71, a low noise amplifier 72, a transmitter/receiver switch module 73, a local oscillation module 74, a memory 75, a digital transmitter processing module 76, a digital-to-analog converter 78, a filtering/gain module 80, an IF mixing up-conversion module, 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing up-conversion module 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74, which may be implemented in accordance with the teachings of the present invention. The IF mixing down-conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, while the digital receiver processing module 64, the digital transmitter processing module 76 and memory 75 may be implemented on a second integrated circuit. The remaining components of the radio 60, less the antenna 86, may be implemented on a third integrated circuit. As an alternate example, the radio 60 may be implemented on a single integrated circuit. As yet another example, the processor module 50 of the host device and the digital receiver and transmitter processing modules 64 and 76, respectively, may be a common processing device implemented on a single integrated circuit. Further, memory 52 and memory 75 may be implemented on a single integrated circuit and/or on the same integrated circuit as the common processing modules of processor module 50 and the digital receiver processing module 64 and digital transmitter processing module 76.

Some or all of the radios 60 of FIG. 1 include power management functionality to enable a power management controller to selectively power down and power up radio receiver elements according to a plurality of different modes or aspects of operation as is described in greater detail with reference to the figures that follow.

Figure 3:
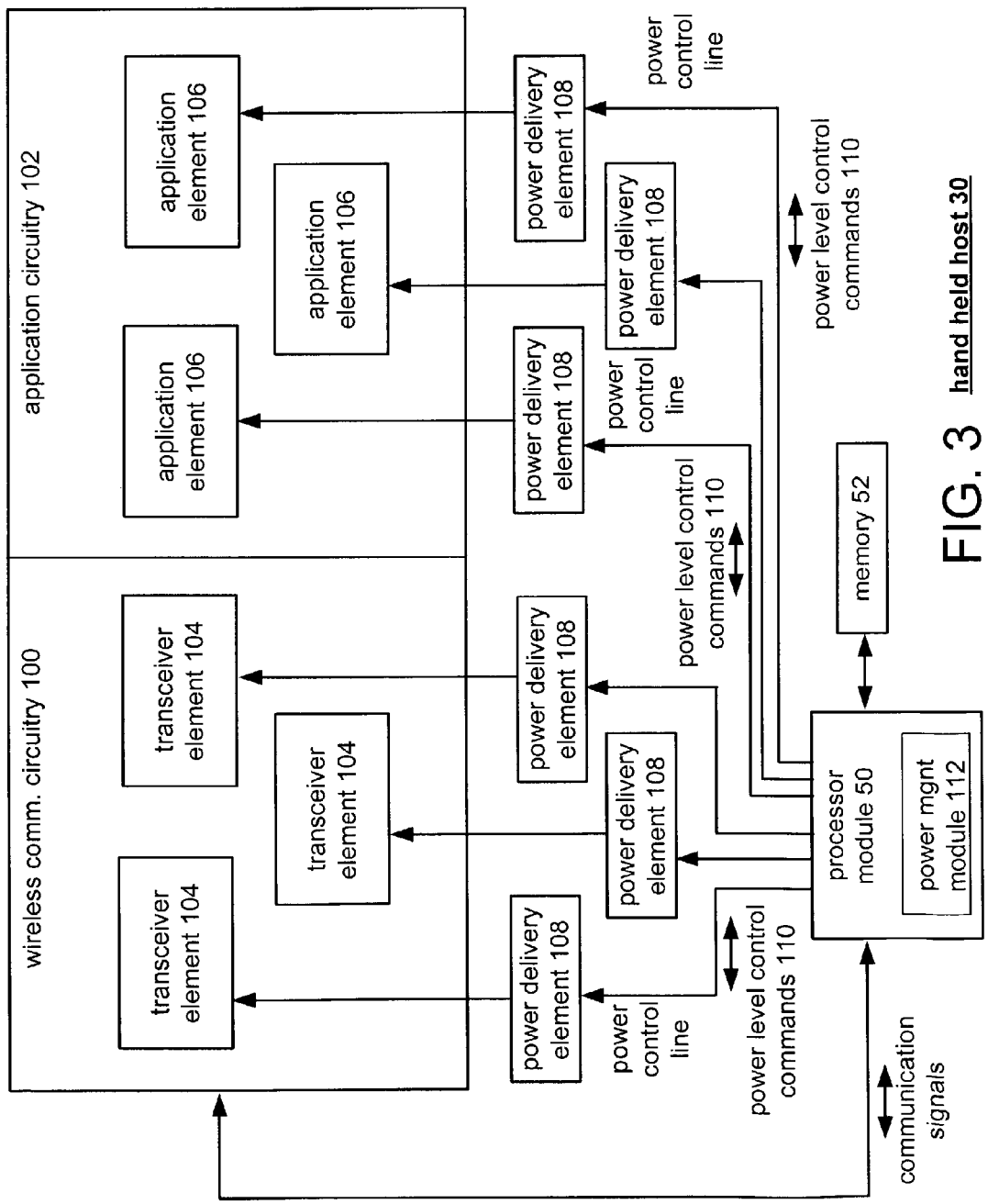
FIG. 3 is a functional block diagram of a hand held host formed according to one embodiment of the present invention.

FIG. 3 is a functional block diagram of a hand held host formed according to one embodiment of the present invention. Hand held host 30 of FIG. 1 is shown here in FIG. 3 and includes wireless communication circuitry 100 and application circuitry 102. Wireless communication circuitry 100 includes a plurality of transceiver elements 104, while application circuitry 102 includes a plurality of application elements 106. The transceiver elements 104 comprise any one of a plurality of wireless transceiver modules (or elements), including cellular voice and data networks, including TDMA, CDMA, GPRS, 1×EVDO and 1×EVDV, as well as 802.04, 802.11 and 802.15 standard-based protocol devices for wireless local area networks (WLANs), wireless personal access network (WPAN) devices, including Bluetooth and WLAN devices, infrared data association (IrDA) standards, and serial infrared communication data links.

Similarly, application circuitry 102 includes application elements 106 that may be any one of a group of elements comprising of remote I/O (RIO) devices, MP3 players, game modules, contact and schedule applications, such as address books and calendars, and peripheral interface modules (PIMs). This list of modules is not exhaustive. The invention applies with equal force to any module installed in a portable device.

As may be seen, each of the transceiver elements 104 and application elements 106 are coupled to a corresponding power delivery element 108. Each of the power delivery elements 108 is coupled to a processor module 50 that generates power level control commands 110 over the power control lines to the power delivery elements 108. Generally, processor module 50 generates power level control commands 110 for each power delivery element to prompt it to provide full power, reduced power or no power, to its corresponding transceiver element 104 or application element 106. Processor module 50 includes a power management module 112, which includes logic to determine the respective power levels for each of the transceiver elements 104 and application elements 106 and generates communications to processor module 50 to prompt it to generate corresponding power level control commands 110 over the corresponding power control lines to the corresponding power delivery elements 108. In one embodiment of the invention, power management module 112 comprises computer instructions that are executed by processor module 50 to achieve operations according to logic defined by the computer instructions. In an alternate embodiment, the logic for power management module 112 is formed in hardware. For example, the logic may be formed in state logic or in a programmable gate array. Additionally, processor module 50 is coupled to communicate with wireless communication circuitry 100 to transmit thereto and receive therefrom communication signals.

As may be seen, the embodiment of FIG. 3 allows power management module 112 to prompt processor module 50 to generate power level control commands 110 to any transceiver element or application element, power delivery element 108 for controlling power provided thereto. Accordingly, intelligent power control may be achieved to maximize battery life and facilitate more intelligent operation of the hand held host 30. At its most rudimentary level, several power modes may be defined. For example, in a first mode of operation, each of the transceiver elements 104 of wireless communication circuitry 100, as well as each of the application elements 106 of application circuitry 102, may be powered on in the first mode of operation.

Alternatively, in a second mode of operation, for example, a silent mode of operation, processor module 50 may generate power level control commands to power delivery elements 108 to result in power being applied only to the application elements 106. Thus, in this embodiment, hand held host 30 may be utilized in environments in which radiation is not permitted. For example, each of the application elements 106 may be powered while a user of hand held host 30 is traveling on a jet airplane, while power is not provided to the transceiver elements 104 in order to comply with federal aviation regulations.

Figure 4:
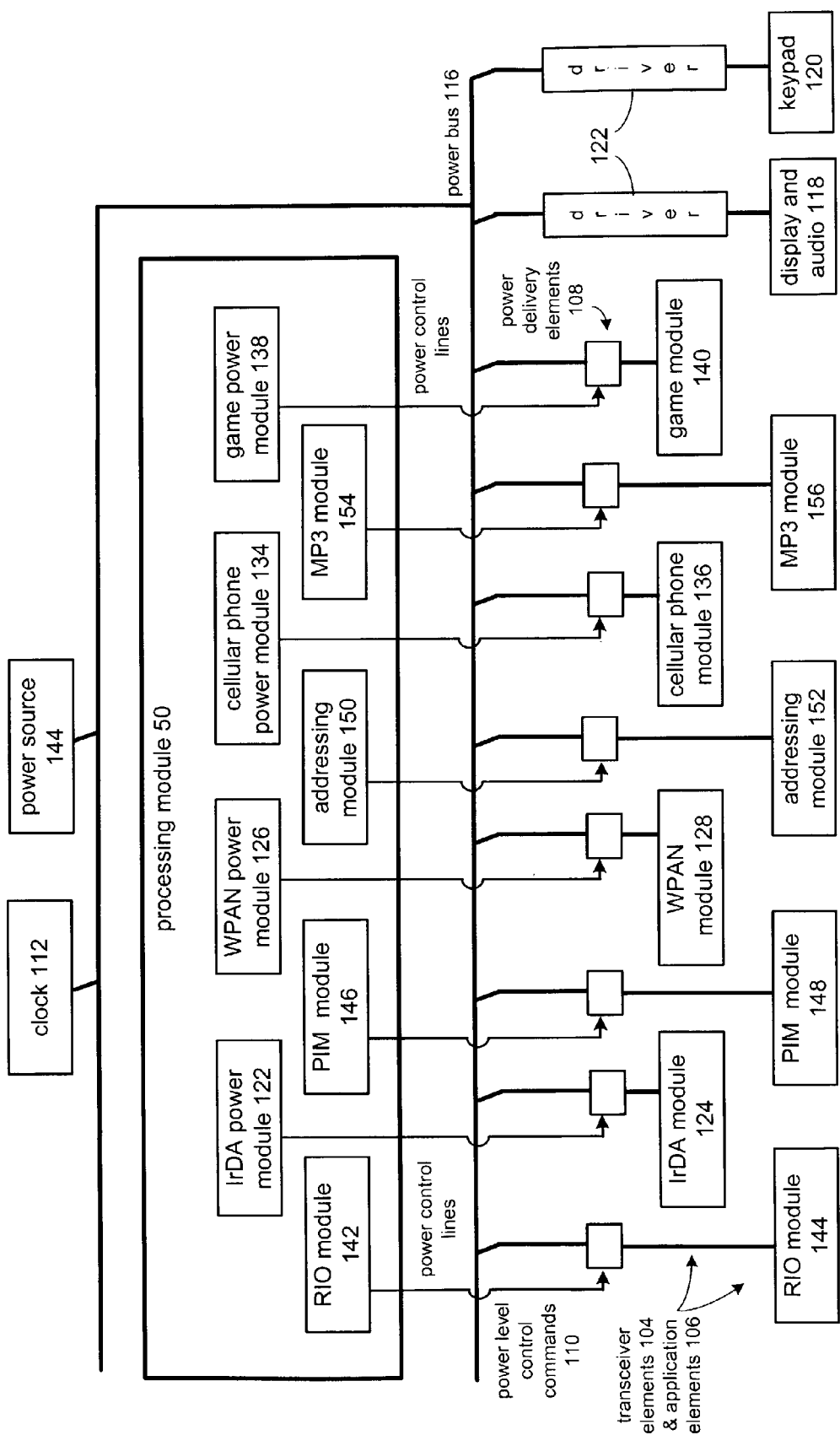
FIG. 4 is a functional block diagram illustrating additional aspects of the invention.

FIG. 4 is a functional block diagram illustrating additional aspects of the invention. As may be seen, a hand held host 32 includes a clock 113 and a power source 114. Power source 114 is coupled to provide power on a power bus 116. Each element, device or module of hand held host 32 is coupled either directly or indirectly to receive power from power bus 116. Thus, processor module 50, as well as each of the various transceiver elements and application elements 104 and 106, respectively, are coupled to receive power from power bus 116. Each of the transceiver and application elements 104 and 106, however, are coupled to receive power indirectly by way of power delivery elements 108. Additionally, A display and audio module 118 and keypad module 120 receive power from power bus 116 by way of a pair of drivers 121.

Within processor module 50, there exists a plurality of logic modules that generate power level control commands 110 over power control lines that are each coupled to a corresponding power delivery element 108. Thus, for example, IrDA power module 122 generates power level control commands 110 for controlling power provided to IrDA module 124. Similarly, WPAN power module 126 controls power delivery to WPAN module 128. Cellular phone power module 134 controls power delivered to cellular phone module 136 and game power module 138 controls power delivered to game module 140. Similarly, RIO power module 142 controls power delivered to RIO module 144, while PIM power module 146 controls power delivered to PIM module 148. Finally, addressing power module 150 controls power delivered to addressing module 152, while MP3 power module 154 controls power delivered to MP3 module 156.

By minimizing the number of modules of the transceiver and application elements 104 and 106 that are powered on, the power drained from power bus 116 provided by power source 114 is reduced. Additionally, in one embodiment of the invention, the clock rate provided by clock 113 further is coupled to receive speed control signals generated by processor module 50 according to what transceiver and application elements 104 and 106 are powered on so as to reduce unnecessary processing speed and power consumption associated therewith. Thus, processor module 50 includes logic to generate speed control signals to clock 113 to provide appropriate clock rates and to further minimize unnecessary consumption of power.

FIG. 5 is a table illustrating one embodiment of the operation of the present invention. As may be seen in the mode-programming table of FIG. 5, for each of the five modes listed in column 160 there exists an indication of a corresponding power mode for each of the transceiver and application elements 104 and 106 listed specifically in columns 164 through 184. The transceiver and application elements 104 and 106 are listed specifically in row 188. More specifically, the present example is for a hand held host that includes a wireless LAN/wireless personal access network (WLAN/WPAN), a pager/short message service (SMS) module, a cell phone, a calculator, at least one game application, and an address book/calendar application. Thus, as may be seen, if mode 1 operation is selected, then each transceiver and application element 104 and 106 listed is powered on as shown generally in row 192. If mode 2 operation is selected, then each of the transceiver elements do not receive power, while each of the application elements do receive power, as is shown generally in row 194. More specifically, the WLAN/WPAN, the pager/SMS and the cell phone do not receive power, while the calculator, game and address book/calendar do receive power.

If mode 3 operation is selected, as shown in row 198, the WLAN/WPAN, pager/SMS and cell phone each receive power only on a periodic basis, while the calculator, game and address book/calendar receive continual power. If mode 4 operation is selected, either by the user or if the hand held host operating according to FIG. 5 selects a low power mode because power resources have dropped below a specified threshold, only the one or more of the transceiver elements 104 receives power on a periodic basis, while all other application elements 106 do not receive power unless specifically selected. Accordingly, as may be seen in row 202, the WLAN/WPAN receives power periodically to enable it to search for and download messages, while the pager/SMS and cell phone are not powered on (unless specifically selected). Similarly, none of the application elements 106 are powered unless specifically selected. Thus, in the example shown, the address book/calendar has been selected and therefore does receive power, while the calculator and game do not receive power.

Finally, row 206 illustrates mode 5 operation, which is a custom mode of operation in the described embodiment. In the custom mode of operation, a user is able to specify in advance what elements receive power during that mode of operation. For example, the user may decide to play a game and to disable the cell phone and pager/SMS, but to enable the WLAN/WPAN to periodically access its corresponding network to download any queued messages or data. Additionally, as may be seen, neither the calculator nor the address book/calendar receive power while the game mode is selected through custom mode 5. As will be illustrated below, the user is able to select what transceiver elements 104 and application elements 106 receive power during the custom mode and the type of power that they receive.

In the described embodiment, mode 4, which is reserved for low power operation, also is programmable. Accordingly, in the example here in FIG. 5, the user has opted to only enable the WLAN/WPAN to operate on a periodic mode, while other transceiver elements 104 do not receive power when the hand held host power levels fall below a specified threshold. Moreover, as is shown herein, none of the application elements 106 receive power unless specifically selected to operate while in the low power mode. Thus, while the calculator and game receive power, the example in FIG. 5 illustrates that the address book/calendar does not receive power (as the parenthetical indicates) unless specifically selected while the hand held host is in the low power mode 4 operation.

FIG. 6 is a table illustrating mode selection according to one aspect of the present invention. As may be seen from referring to FIG. 6, the column shown generally at 210 lists each of the five modes of one embodiment of the present invention, while the column shown generally at 214 illustrates the selection of the mode of operation. Accordingly, as may be seen, mode 5 has been selected as the operating mode for the hand held host as described in this embodiment. In the specific example, mode 5 corresponds to the custom mode of row 206 in FIG. 5. In one embodiment, all options are shown at once. In an alternate embodiment, less than all embodiments are shown and the user must scroll through the options to select the mode of operation.

FIG. 7 is a table illustrating an aspect of one embodiment of the present invention and, more specifically, the selection of operating parameters for a custom mode of operation. As may be seen, transceiver elements 104 are shown in the upper portion of the table of FIG. 7, while the application elements 106 are shown in the bottom portion. For each of the transceiver elements 104, namely, the WLAN/WPAN, the pager/SMS, and the cell phone, the user has the option of selecting whether the transceiver element is to receive power, is not to receive power, or is to receive power on a periodic basis. Thus, in the example shown, the WLAN/WPAN is to receive power periodically, while the pager/SMS and cell phone are not to receive power whenever the custom mode 5 operation is selected.

In the described embodiment, periodic refers to the transceiver element receiving power on a periodic basis, for example, once every 5 minutes, to enable the corresponding transceiver element to communicate with an external node to download queued messages or data therefrom. Once the communication is complete and the transceiver element determines that there are no more messages or data to be downloaded, then the transceiver element is powered off. In the described embodiment, the transceiver element is powered on once every 5 minutes. The duration of the period, however, may easily be modified and may even be modified on a transceiver element by transceiver element basis. In one embodiment of the present invention, the user is able to select the period intervals for each of the transceiver elements when operating in the periodic mode of operation.

With respect to the application elements 106 shown in the bottom portion of the custom application selection table of FIG. 7, one may note that the user has selected for the game module of the application elements 106 to receive power, while the calculator and other applications do not receive power. In the described embodiment, only one application element 106 receives power in a given mode, including the custom mode of operation. In alternate embodiments, multiple application elements are allowed to receive power at the time. In a full power mode in the described embodiment, however, only one application element receives power.

The transceiver elements 104, on the other hand, all receive power in a full power mode so that they all may operate to communicate with their corresponding networks. Thus, in a full power mode, the cell phone can receive calls, the pager/SMS module may receive pages and SMS messages, and the WLAN/WPAN may receive text files, emails, etc., all at the same time and, thus, all are powered on in a full power mode while only one application element (at most) receives power. In the embodiment of this invention, the hand held host powers on to one of a defined application element or a last-selected application element and requires user selection prior to applying power to any one or more transceiver elements. As is described herein, however, many different embodiments exist for power on operation.

In the custom power mode, as shown in FIG. 7, each of the devices that receive power is selectable and thus receives power according to user preference. In the example of FIG. 7, in summary, only the game module receives power continuously and the WLAN/WPAN receives power periodically. All other devices, in the custom mode of operation, do not receive power until the user makes changes to his or her selections shown in the table of FIG. 7. In general, FIG. 7 reflects that a user may make power selections, which are then mapped to the custom mode of operation and are enabled whenever the custom mode is selected.

FIG. 8 illustrates a default power on selection table illustrating yet another aspect of the present invention. In general, one consideration is what default mode of operation exists for a hand held host whenever power is initially applied. In one embodiment of the invention, the default mode of operation includes applying power only to a selected application element 106 that does not radiate radio frequency wireless transmission signals. Thus, a user may readily power on the hand held host in an airplane without violating Federal Aviation regulations.

In an alternate embodiment of the invention, and in the one illustrated by FIG. 8, the user is able to select a default operational mode. Thus, as shown in row 218, the user is able to specify the default mode is always the last selected mode. In rows 222 through 236, however, the user is able to specify which of the five modes of operation is the default mode. In this example, the user has selected mode 5 (the custom mode) as the default mode of operation. Accordingly, if the custom mode of operation is as defined in FIG. 7, when the user powers on the hand held host, only the game module initially receives power on a continual basis, while the WLAN/WPAN receives power on a periodic basis. Thus, if the user were on a flight, he or she would need to immediately disable power to the WLAN/WPAN so as not to violate Federal Aviation regulations. If, on the other hand, the user is not in an environment which electromagnetic radiations are prohibited, then the configuration for the custom mode of operation of FIG. 7 is ideal for a user that wishes to play a game, for example, without significant interruption from the cell phone and/or pager.

FIG. 9 is a functional block diagram of an alternate embodiment of the invention of a hand held host. Referring to FIG. 9, the hand held host 240 includes a processor 242 that communicates with a radio front end 244 over a bus 246. The radio front end 244 includes typical radio front end components, such as those shown in and described in relation to FIG. 2. Hand held host 240 further includes a memory 248 for storing computer instructions that define the operational logic of hand held host 240. Processor 242 retrieves the computer instructions from memory 248, as well as from a temporary memory 250 over an internal bus 252. In the described embodiment, processor 242 communicates with radio front end 244 over the bus or communication lines represented by 246 and with memory 248 and temporary memory 250 over internal bus 252. It is understood, of course, that many different types of connections may be implemented to facilitate the communication between processor 242, memory 248 and temporary memory 250, as well as between processor 242 and radio front end 244.

Continuing to examine the hand held host 240 of FIG. 9, it may be seen that three hardware switches 254, 256 and 258 are provided, each of which is for prompting a switch interpretation module 260 to power on hand held host 240 in a corresponding mode of operation. For example, in the described embodiment, switch 254 relates to power mode 1 operation, while switch 256 relates to power mode 2 operation and switch 258 relates to power mode 5 (the custom mode) of operation. Thus, whenever hand held host 240 is powered off and is dormant, the depression of one of the switches, namely, switches 254, 256 or 258, will cause processor 242 to execute computer instructions within memory 248 to operate in the corresponding power mode of operation. If, for example, switch 258 is depressed, switch interpretation module 260 initiates power up routines and transmits selected mode information to processor 242, which it implements as it powers up hand held host 240 to prompt hand held host 240 to power up into the custom power mode of operation. In the examples, herein, since the custom power mode of operation provides for periodic power to be applied to the WLAN/WPAN and continuous power to the game module and for all other modules and elements to be powered off, processor 242 will provide power to the corresponding modules in the described manner if the custom mode is programmed as shown in FIG. 5.

In the embodiment of FIG. 9, each of the modules (and elements) described, for example, in FIGS. 4 and 5, are logically formed by the execution of computer instructions stored within memory 248 that define logic to create and operate according to logic of the corresponding modules. It is understood, of course, that this is an alternate embodiment and that the modules may readily be formed in hardware or a combination of hardware and software as well. Additionally, if hand held host 240 is presently operating in a mode (any defined power mode), and one of the three switches 254, 256 or 258 is depressed, then hand held host 240 will change modes to the one that corresponds to the depressed power mode switch. Finally, while not shown specifically herein, it is understood that a user menu may be created to enable the user to select modes of operation correspond with the three switches 254, 256 and 258. Thus, switch 258 may readily be programmed to initiate any other power mode of operation. Similarly, corresponding power modes of operation may be defined for switches 254 and 256. Additionally, as shown herein, the characteristics of each mode also are selectable.

FIG. 10 is a flowchart illustrating a method of one embodiment of the present invention. Initially, a hand held host determines a power mode of operation comprising one of a silent mode, a fully enabled communication mode and a periodic communication mode (step 260). The hand held host is a transceiver device that includes both transceiver elements and non-communication application elements. For example, the hand held host can include any of the aforementioned transceiver elements 104 or application elements 106. Thereafter, the hand held host delivers power to corresponding transceiver and application elements to cause the hand held host to operate in one of a plurality of power modes of operation (step 262). Step 262 further includes at least one of the steps of generating control signals to a first specified group of power delivery elements to deliver power to transceiver elements that communicate with other devices by way of a wireless medium (step 264) or generate control signals to a second specified group of power delivery elements to deliver power to application elements that do not communicate with other devices by way of a wireless medium (step 266).

For the present example illustrated in the steps of FIG. 10, the fully enabled communication mode comprises delivering control signals to each power delivery element coupled to provide power to each of the transceiver elements that communicate with other devices by way of a wireless medium. A silent mode comprises generating no control signals to the power delivery elements that deliver power to the transceiver elements (or, alternatively, generating control signals to prompt the power delivery elements to not deliver power to the corresponding transceiver or application elements) that communicate with other devices by way of a wireless medium and further includes generating at least one control signal to at least one power delivery element that delivers power to an application module that does not communicate with other devices by way of a wireless medium. For example, an application module that provides a calendar function or address function or, for example, a game function.

FIG. 11 is a flowchart illustrating an aspect of the operation of one embodiment of the present invention. Initially, a hand held host receives a power on indication (step 270) and determines a corresponding mode of operation and provides power accordingly to corresponding transceiver modules (step 272). Additionally, the hand held host generates a display menu on a display element to enable a user to select what transceiver modules receive power for a specified power mode (step 274). The transceiver elements herein include those that are able to communicate with other devices by way of a wireless medium (through RF). Optionally, the method of FIG. 11 includes generating a display menu to the user on the display element to enable the user to select what transceiver elements receive power for a custom power mode (step 276). A custom power mode is one that enables the user to select what transceiver elements and application modules receive power for a custom power mode.

FIG. 12 is a flowchart illustrating an aspect of one embodiment of the invention. Initially, a hand held host powers on to a default mode of operation wherein the default mode of operation is one of a full power mode in which all transceiver elements and application elements are powered, a silent mode in which only non-radiating application elements are powered or a periodic mode in which radiating transceiver elements are only occasionally powered, or to a custom mode in which a user specifies what transceiver elements and application elements are powered and what application elements and transceiver elements are periodically powered (step 278). Thereafter, the hand held host determines that a new power mode of operation has been selected and provides power accordingly to the corresponding transceiver and application elements (step 280). Thereafter, optionally, the hand held host generates a display menu when a display element to enable the user to select what transceiver and application elements receive power for a specified power mode (step 282). Finally, the hand held host generates a display menu to the user on the display element to enable the user to select what transceiver elements and application elements receive power and what transceiver elements receive power to operate in a periodic mode of operation for a custom power mode (step 284).

One difference between the optional step 282 and step 284 is that step 282 provides for custom selection of what transceiver elements and application elements receive power during the custom mode of operation whenever the custom mode of operation is selected. The optional step 282, however, further allows for some custom selection of power for the transceiver elements and/or the application elements in specified modes of operation besides the custom power mode of operation. Effectively, step 284 provides for one custom mode of operation, while step 282 potentially provides multiple custom modes of operation.

Figure 13:
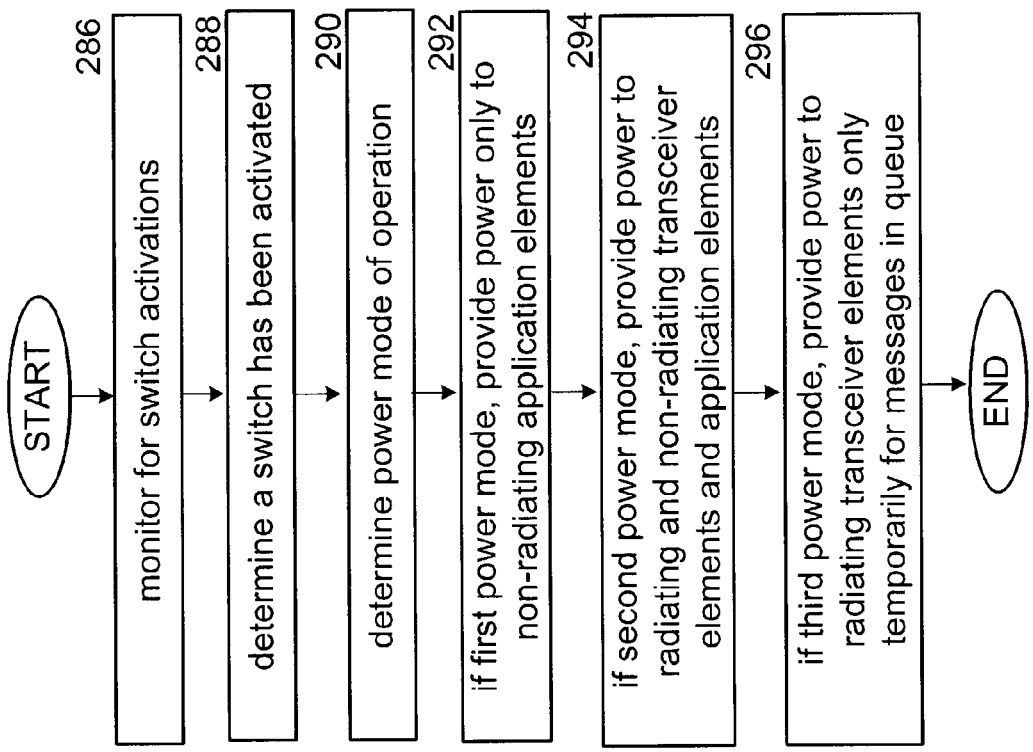
FIG. 13 is a flowchart illustrating a method according to an alternate embodiment of the present invention.

FIG. 13 is a flowchart illustrating a method according to an alternate embodiment of the present invention. Initially, a hand held device having a plurality of power switches monitors each of the plurality of power switches for switch activation (step 286). In one described embodiment of the invention, the hand held host includes three power switches, each of which corresponds to a mode of operation. Accordingly, the hand held device monitors the three switches for switch activation, thereby indicating that a corresponding power mode of operation has been selected or, if the hand held device is powered off, that it should power on into the selected power mode of operation. Thus, the second step, while continuously monitoring for the switch activations, is to determine that one of the plurality of switches has been activated (step 288) and, as mentioned before, the hand held host must determine the corresponding power mode of operation (step 290). If a switch corresponding to a first power mode of operation is selected, the hand held host will provide power only to non-radiating application elements (step 292). If a second power mode of operation is selected by the user, the hand held host will provide power to radiating and non-radiating transceiver elements and application elements, respectively (step 294). Finally, if a third power mode of operation is selected by the user, the hand held host will provide power to radiating transceiver elements only temporarily and on a periodic basis for the transceiver elements to retrieve messages that are stored in a queue by an external device (step 296). This periodic mode is to enable at least one transceiver application to determine if an external device is attempting to communicate with it or if it has data or messages to deliver to the hand held host.

FIG. 14 is a flowchart illustrating a method for power control of a hand held host with transceiver and application elements according to one embodiment of the present invention. Initially, the inventive method includes powering up to a silent mode of operation (step 300). Thereafter, the invention includes determining whether to provide power to at least one transceiver element (step 302). After determining whether to provide power to at least one transceiver element, the invention includes determining if power is to be applied to the at least one transceiver element, and whether to apply power continuously or periodically (step 304). If power is to be applied to the at least one transceiver element periodically, the power is provided sufficiently long to enable the specific element to engage in a communication session with an external device. For example, power is provided to enable the hand held host to download a message or a plurality of messages. Once the download is complete, the transceiver element generates a signal to prompt a power controller to power down the transceiver element. In another embodiment, the transceiver element merely powers itself down after it is done downloading whenever the hand held host is in a periodic mode of operation.

After determining whether to apply power periodically or continuously, the invention includes providing a display on a display device of the hand held host to enable a user to select a power-mode mode of operation and monitoring specified switch activations to recognize and interpret the user's selection (step 306). The invention also includes providing a display on a display device of the hand held host to enable a user to select what hand held host elements receive power at power-up and monitoring specified switch activations to recognize and interpret the user's selection (step 308). Finally, the invention includes operating in a mode wherein at least one transceiver element is receiving power and further including monitoring for activation of a specified switch and, upon detection of the specified switch being activated, removing power from the at least one transceiver element to operate in a silent mode of operation (step 310). Each of the switch selections that are monitored may be a physical switch or a "soft switch", meaning that a specified key depression, when prompted, stands for a requested result (e.g., "1" equals "yes" and "0" equals "no").

FIG. 15 is a flow chart illustrating an additional embodiment of the present invention. For the purpose of explaining this additional embodiment of the present invention, a hand held host first determines whether power is to be applied to the at least one transceiver element, and, if so, whether to apply power continuously or periodically (step 312). As described before, a periodic mode of operation includes providing power periodically to selected transceiver elements to enable the transceiver elements to down load pending messages or queued data.

As a variation of the periodic mode of operation, however, a hand held device operates with at least one transceiver element in a silent network detection ("sniff") mode of operation (step 314). As has been described previously, the silent mode of operation is a mode in which the transceiver elements are not powered on and are not radiating any wireless communication signals. A silent network detection mode of operation, or "sniff" mode, is one in which a transceiver element is powered off and, periodically, is powered on sufficiently to enable it to determine whether a supporting or corresponding network is operationally present. Thus, for step 314, at least one transceiver element is not powered on and is in a silent mode of operation. Whether this at least one transceiver element is in a periodic mode of operation as defined herein or in a silent network detection mode of operation depends upon user selection and network conditions.

To illustrate, a first group of transceiver elements may operate in the periodic mode of operation meaning that they are powered on periodically after a defined period of time has elapsed to enable the first group of transceiver elements to communicate with corresponding networks to download messages or data. Here, however, the at least one transceiver element in the silent network detection mode of operation is powered only to an extent necessary to determine if a corresponding wireless network is present and operational. The interval between being powered, however, may be different and significantly greater than the interval for the periodic mode of operation (or it may be equal).

Thus, for example, the group of transceiver elements operating in the periodic mode of operation would be provided power every five minutes (for example) to enable them to communicate with their corresponding networks. The at least one transceiver element operating in the silent network detection mode, however, is only powered on every 20 minutes (for example) to an extent necessary to "sniff" or detect a corresponding wireless network that is present and operational.

Thereafter, the invention includes determining whether to provide power to the at least one transceiver element operating in the silent mode of operation to enable the at least one transceiver element to "sniff" for or detect a corresponding network (step 316). As defined herein, "sniffing" includes providing an adequate amount of power to at least a portion of a transceiver element to enable the transceiver element of the hand held host containing the transceiver element to determine whether a corresponding wireless network is present and operational to enable the transceiver element to communicate therewith. Thus, the invention further includes providing power to at least one transceiver element operating in the network detection mode of operation to determine if, for the at least one transceiver element, a supporting wireless network is present and operational (step 318). Finally, the invention includes determining, for each detected wireless network, whether the detected wireless network has data or messages to be downloaded (step 320).

In an alternate embodiment of the invention, whenever the user selects the periodic mode of operation for a group of transceiver elements, the transceiver elements are powered periodically as described before. If, however, a transceiver element is not able to detect a corresponding network, then the hand held device places the transceiver element into the silent network detection mode of operation wherein it is not powered as frequently as the remaining transceiver elements of the group of transceiver elements for which operational corresponding networks exist. Thus, battery power is not needlessly consumed powering up a transceiver element that, in all probability, does not have a supporting network operationally present.

As a further aspect of the present of the invention, the network detection mode of operation comprises providing a minimal amount of power to make an approximate determination as to whether a corresponding network is operationally present. For example, portions of a receiver front end may be powered only sufficiently to determine whether there exists electrical energy in a specified channel. To illustrate, a low noise amplifier and a received signal strength indicator circuit may be provided enough power to determine whether a specified channel contains the possibility of communication signals being broadcast thereon.

The preceding discussion has presented a method and apparatus for a radio receiver including a power management controller for extending a receiver's battery life. As one of average skill in the art will appreciate, other embodiments may be derived from the teaching of the present invention, without deviating from the scope of the claims.

What is claimed is:

1. A radio transceiver hand held host, comprising:
   wireless communication circuitry for transmitting and receiving radio frequency communication signals, the wireless communication circuitry further including a plurality of transceiver and application elements;
   a processor module coupled to receive and generate communication signals from and to the wireless communication circuitry;
   logic for prompting the processor module to control power levels of the plurality of transceiver and application elements, collectively, host elements, according to a user selected operational mode of the radio transceiver that are defined by logic within the radio transceiver;
   a plurality of power delivery elements coupled to the corresponding host elements of the plurality of power delivery elements for selectively delivering power to the corresponding host element, the plurality of power delivery elements further coupled to receive control commands from the processor module; and
   wherein the radio transceiver hand held host is operable to provide a custom power mode of operation that enables a user to selectively map the transceiver and application elements to at least one of a plurality of power modes of operation.

2. The radio transceiver hand held host of claim 1 wherein each of corresponding plurality of power delivery elements comprise switches that couple a power source to a corresponding host element.

3. The radio transceiver hand held host of claim 1 wherein each of corresponding plurality of power delivery elements comprise drivers that selectively provide power to a corresponding host element.

4. The radio transceiver hand held host of claim 1 wherein the at least one logic module comprises logic formed in hardware.

5. The radio transceiver hand held host of claim 4 wherein the logic comprises state logic.

6. The radio transceiver hand held host of claim 4 wherein the logic comprises a programmable gate array.

7. The radio transceiver hand held host of claim 1 wherein the logic module includes memory comprising computer instructions defining operational logic wherein the processor module is coupled to receive and execute the computer instructions.

8. The radio transceiver hand held host of claim 1 wherein the processor module includes logic for selectively powering a wireless personal area network (WPAN) module.

9. The radio transceiver hand held host of claim 8 wherein the WPAN module operates according to one of Bluetooth specification or 802.15 standard based protocols.

10. The radio transceiver hand held host of claim 1 wherein the processor module includes logic for selectively powering a wireless local area network (WLAN) module.

11. The radio transceiver hand held host of claim 10 wherein the WLAN module operates according to one of 802.11a or 802.11b standard based protocols.

12. The radio transceiver hand held host of claim 1 wherein the processor module includes logic for selectively powering a wireless headset transceiver module.

13. The radio transceiver hand held host of claim 1 wherein the processor module includes logic for selectively powering a game module.

14. The radio transceiver hand held host of claim 1 wherein the processor module includes logic for selectively powering an MP3 module.

15. The radio transceiver hand held host of claim 1 wherein the processor module includes logic for selectively powering a calculator module.

16. The radio transceiver hand held host of claim 1 wherein the processor module includes logic for selectively powering an audio module.

17. The radio transceiver hand held host of claim 1 wherein the processor module includes logic for selectively powering an Infrared Data Association (IrDA) standards serial infrared communications data link.

18. The radio transceiver hand held host of claim 1 wherein the processor module includes logic for selectively powering a remote I/O (RIO) module.

19. The radio transceiver hand held host of claim 1 wherein the processor module includes logic for selectively powering a cellular phone transceiver front end circuit.

20. A hand held device, comprising:
   a first wireless transceiver module for transmitting and receiving radio frequency communication signals;
   a second wireless transceiver module for transmitting and receiving radio frequency communication signals;
   a first application module for providing a first application function;
   a second application module for providing a second application function;
   a selective power supply module coupled to selectively provide power to the first and second radio transceiver modules and the first and second application modules; and
   a control module for generating control signals to the selective power supply module to control when and what modules of the first and second radio transceiver modules and the first and second application modules receive power according to a user selected power mode of operation; and
   wherein the hand held device is operable to provide a custom power mode of operation that enables a user to selectively map the transceiver and application elements to at least one of a plurality of power modes of operation.

21. The hand held device of claim 17 wherein the selective power module comprising a plurality of power delivery agents for delivering power to each of the first and second radio transceiver modules, the IrDA data link module and the first and second application modules, wherein each power delivery agent comprises an input node for receiving the control signals from the control module.

22. The hand held device of claim 19 wherein the control module comprises logic formed in hardware.

23. The hand held device of claim 22 wherein the logic is state logic.

24. The hand held device of claim 22 wherein the logic is programmable gate array.

25. The hand held device of claim 20 wherein the control module comprises a processor and a memory that includes computer instructions defining operational logic wherein the processor is coupled to receive and execute the computer instructions.

26. The hand held device of claim 20 wherein the control module includes logic for selectively powering a wireless personal area network (WPAN) module, wherein one of the first and second radio transceiver modules comprises the WPAN module.

27. The radio transceiver of claim 26 wherein the WPAN module operates according to 802.15 standard based protocol or according to Bluetooth specifications.

28. The hand held device of claim 20 wherein the control module includes logic for selectively powering a wireless local area network (WLAN) module, wherein one of the first and second radio transceiver modules comprises the WLAN module.

29. The hand held device of claim 28 wherein the WLAN module operates according to one of 802.11a or 802.11b standard based protocols.

30. The hand held device of claim 20 wherein the control module includes logic for selectively powering an Infrared Data Association (IrDA) standards serial infrared communications data link module.

31. The hand held device of claim 20 wherein the processor module includes logic for selectively powering an audio module, wherein one of the first and second application modules comprises the audio module.

32. The hand held device of claim 20 wherein the control module includes logic for selectively powering a remote I/O (RIO) device, wherein one of the first and second application modules comprises the RIO device.

33. The hand held device of claim 20 wherein the control module includes logic for selectively powering a cellular phone transceiver front end circuit, wherein one of the first and second radio transceiver modules comprises the WLAN cellular phone transceiver front end circuit.

34. The hand held device of claim 20 wherein the control module includes logic for selectively powering a wireless headset transceiver module, wherein one of the first and second radio transceiver modules comprises the wireless headset transceiver module.

35. The hand held device of claim 20 wherein the control module includes logic for selectively powering a game module, wherein one of the first and second application modules comprises the game module.

36. The hand held device of claim 20 wherein the control module includes logic for selectively powering an MP3 module, wherein one of the first and second application modules comprises the MP3 module.

37. The hand held device of claim 20 wherein the control module includes logic for selectively powering a calculator module, wherein one of the first and second application modules comprises the calculator module.

38. The hand held device of claim 20 further including a plurality of switches, each of the plurality of switches corresponding to the power mode of operation wherein the control module is coupled to receive and interpret the user selected power mode of operation according to selected switch actions of the plurality of switches.

39. The hand held device of claim 38 wherein each of the corresponding power modes of operation is mapped to a power on state of each of the first and second radio transceiver modules and the first and second application modules.

40. A hand held device, comprising:
front end radio transceiver means for transmitting and receiving RF signals;
application means for performing at least one of a plurality of application functions;
infrared communication means for communicating over a wireless medium;
power means coupled to selectively provide power to the front end radio transceiver means, the application means and the infrared communication means, each of which is formed within the hand held device;
logic means coupled to the power means for providing control signals to the power means to prompt the power means to provide power according to a user selected power mode of operation; and
wherein the hand held device is operable to provide a custom power mode of operation that enables a user to selectively map the transceiver and application elements to at least one of a plurality of power modes of operation.

41. The hand held device of claim 40 wherein the logic means comprises logic for grouping a plurality of modules into groups of modules and logic for prompting the power means to selectively supply power to one or more of the groups of modules.

42. The hand held device of claim 41 wherein the logic means further comprises logic for powering only at least one group of modules that do not generates wireless communication signals.

43. The hand held device of claim 41 wherein the logic means further comprises logic for powering a group of modules that do not generate wireless communication signals and a group of modules that generates wireless communication signals.

* * * * *

UNITED STATES PATENT AND TRADEMARK OFFICE
CERTIFICATE OF CORRECTION

| | |
|---|---|
| PATENT NO. | : 7,266,389 B2 |
| APPLICATION NO. | : 10/285005 |
| DATED | : September 4, 2007 |
| INVENTOR(S) | : Jeyhan Karaoguz and Nambi Seshadri |

It is certified that error appears in the above-identified patent and that said Letters Patent is hereby corrected as shown below:

Column 1, lines 7-13, with the following rewritten paragraphs:

The present U.S. Utility Patent Application claims priority pursuant to 35 U.S.C. § 120, as a continuation-in-part (CIP), to the following U.S. Utility Patent Application which is hereby incorporated herein by reference in its entirety and made part of the present U.S. Utility Patent Application for all purposes:

1. U.S. Utility Application Serial No. 10/277,787, entitled "Power Management of Radio Transceiver Elements," (Attorney Docket No. BP2544), filed October 22, 2002, pending.

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Serial No. 60/403,224, entitled "Power Management of Radio Receiver Elements," (Attorney Docket No. BP2544), filed August 12, 2002, expired.

Signed and Sealed this

First Day of September, 2009

David J. Kappos
*Director of the United States Patent and Trademark Office*